United States Patent
Arora et al.

(10) Patent No.: US 9,336,809 B2
(45) Date of Patent: May 10, 2016

(54) METHOD FOR MAKING AN IMPRINT TEMPLATE WITH DATA REGIONS AND NON-DATA REGIONS USING BLOCK COPOLYMERS

(71) Applicant: HGST Netherlands B.V., Amsterdam (NL)

(72) Inventors: Hitesh Arora, Fremont, CA (US); Sripathi Vangipuram Canchi, San Jose, CA (US); Franck Dreyfus Rose, San Jose, CA (US); Ricardo Ruiz, Santa Clara, CA (US); Vipin Ayanoor-Vitikkate, Union City, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/471,103

(22) Filed: Aug. 28, 2014

(65) Prior Publication Data

US 2016/0064027 A1 Mar. 3, 2016

(51) Int. Cl.
| | |
|---|---|
| *B44C 1/22* | (2006.01) |
| *B23P 15/00* | (2006.01) |
| *C03C 25/00* | (2006.01) |
| *C23F 1/00* | (2006.01) |
| *C03C 25/68* | (2006.01) |
| *H01L 21/00* | (2006.01) |
| *G11B 5/84* | (2006.01) |

(52) U.S. Cl.
CPC .................................... *G11B 5/84* (2013.01)

(58) Field of Classification Search
USPC .......................................................... 216/22
See application file for complete search history.

(56) References Cited

U.S. PATENT DOCUMENTS

| | | | | |
|---|---|---|---|---|
| 2008/0217292 A1* | 9/2008 | Millward | ............... | B82Y 30/00 216/46 |
| 2012/0147718 A1* | 6/2012 | Hellwig | ................... | G11B 5/66 369/13.33 |
| 2013/0186856 A1* | 7/2013 | Xiao | ....................... | B05D 3/107 216/47 |
| 2015/0116690 A1* | 4/2015 | Wang | .................. | G03F 7/70483 355/77 |

* cited by examiner

*Primary Examiner* — Thomas Pham
(74) *Attorney, Agent, or Firm* — Thomas R. Berthold

(57) ABSTRACT

A method to fabricate an imprint template for bit-patterned magnetic recording media using block copolymers (BCPs) integrates data region patterning and servo region patterning. A heat sink layer is formed on the imprint substrate only in the data regions. A sublayer for the BCP is deposited over both the data regions and the servo regions and patterned to form stripes in the data regions and servo features in the servo regions. A BCP is then deposited in both the data and servo regions. Only the BCP in the data regions is heated, which causes phase separation of the BCP in the data regions into the two BCP components. The selective heating may be accomplished by directed controlled laser radiation to only the data regions. The heat sink layer below the data regions absorbs the heat from the laser radiation, confining it to the data regions.

10 Claims, 7 Drawing Sheets

METHOD FOR MAKING AN IMPRINT TEMPLATE WITH DATA REGIONS AND NON-DATA REGIONS USING BLOCK COPOLYMERS

BACKGROUND OF THE INVENTION

1. Field of the Invention

This invention relates generally to a method using directed self-assembly of block copolymers for making an imprint template for imprinting patterned-media magnetic recording disks.

2. Description of the Related Art

Magnetic recording hard disk drives with patterned magnetic recording media have been proposed to increase data density. In patterned media, also called bit-patterned media (BPM), the magnetic recording layer on the disk is patterned into small isolated data islands separated by nonmagnetic spaces or trenches and arranged in concentric generally circular data tracks. To produce the required magnetic isolation of the patterned data islands, the magnetic moment of spaces between the islands must be destroyed or substantially reduced to render these spaces essentially nonmagnetic. In one type of BPM the magnetic material is deposited on a flat disk substrate. The magnetic data islands are then formed by milling, etching or ion-bombarding of the area surrounding the data islands. BPM disks may be perpendicular magnetic recording disks, wherein the magnetization directions are perpendicular to or out-of-the-plane of the recording layer.

One proposed method for fabricating BPM disks is by imprinting with a template, sometimes also called a "stamper", that has a topographic surface pattern. In this method the magnetic recording disk substrate with a polymer film on its surface is pressed against the template. The patterns on the template may be protrusions (pillars), or recesses (holes), and the type of the pattern is referred to as the polarity of the template. The polymer film receives the reverse image of the template pattern and then, depending on the polarity of the template, either becomes a mask for subsequent etching of the disk substrate if the template is hole-type, or becomes a sacrificial layer for a tone reversal process such as liftoff followed by etching of the disk substrate, if the template is pillar type, to form pillars on the disk in both cases. In one type of BPM disk, the magnetic layer and other layers needed for the magnetic recording disk are then deposited onto the etched disk substrate and the tops of the pillars to form the BPM disk. In another type of BPM, the magnetic layers and other layers needed for the magnetic recording disk are first deposited on the flat disk substrate. The polymer film used with imprinting is then pressed on top of these layers. The polymer film receives the reverse image of the template pattern and then becomes a mask, or sacrificial layer for tone reversal, for subsequent milling, etching or ion-bombarding the underlying layers.

The template may be a master template for directly imprinting the disks. However, the more likely approach is to fabricate a master template with a pattern of pillars corresponding to the pattern of pillars desired for the disks and to use this master template to fabricate replica templates using imprint lithography. The replica templates may have the opposite or same polarity of the master template. The replica templates are then used to directly imprint the disks.

The making of a master imprint template is a difficult and challenging process. To achieve BPM disks with an ultra-high areal bit density greater than 1 Terabits/in$^2$, a track pitch and an island pitch of about 20 nm will be required. Directed self-assembly of block copolymers (BCPs) has been proposed for making the template and is believed capable of achieving areal bit densities of greater than 1 Terabit/in$^2$. U.S. Pat. No. 7,976,715 B2, assigned to the same assignee as this application, describes the use of directed or guided self-assembly of block copolymers to form a pattern of generally radial lines on a template substrate, followed by conventional lithography to form a pattern of concentric generally circular rings over the radial lines. After etching of the substrate and removal of resist, the substrate has a pattern of protrusions of the other block copolymer component, which are then used as an etch mask to etch the substrate into a pattern for imprinting disks with discrete data islands arranged in concentric generally circular data tracks.

Another method to generate a master template containing a pattern of pillars corresponding to the pattern of data islands is to combine the patterns from two submaster templates using separate imprint steps. Each imprint submaster template is created using directed self-assembly of BCPs, and may also require line-doubling techniques for even smaller pattern size and higher density. Pending application Ser. No. 13/627,492, filed Sep. 26, 2012 and assigned to the same assignee as this application, describes the use of two such imprint submaster templates, one with a pattern of generally radial spokes or lines, and the other with generally concentric rings, to make the master template by two separate imprinting steps with the two submaster templates.

Like conventional non-patterned disks, BPM disks are also required to have non-data servo regions that are used for read/write head positioning. However, unlike the data islands, which are generally the same size and shape and are arranged in a periodic pattern, the servo islands typically have different sizes and shapes and do not form a periodic pattern. The servo trenches are typically much wider than the data trenches. The servo islands are thus not capable of being formed by self-assembly of BCPs so the servo regions must be masked during formation of the periodic patterns in the data regions and then the servo islands formed by separate lithographic processing steps.

What is needed is a method for making an imprint template using self-assembly of BCPs that can result in the simultaneous formation of the desired high-density patterns in the data regions and the required servo islands in the servo regions.

SUMMARY OF THE INVENTION

Embodiments of this invention relate to a method to fabricate a BPM imprint template using BCPs that integrates data region patterning and non-data or servo region patterning. This is achieved through selective localized heating of the BCP in the data regions of the template while protecting the BCP in the servo regions from being heated. A heat sink layer is formed on the imprint substrate only in the regions that will become the data regions. A sublayer for the BCP is then deposited over both the data regions and the servo regions and then lithographically patterned to form stripes in the data regions and servo features in the servo regions. Hard mask material is then deposited only in the servo regions. After removal of the resist a BCP is deposited in both the data and servo regions. Then only the BCP in the data regions is heated to cause phase separation of the BCP in the data regions into the two BCP components. In one embodiment this is accomplished by directed controlled laser radiation to only the data regions. The heat sink layer below the data regions absorbs the heat from the laser radiation, confining it to the data regions. In another embodiment this is accomplished by microwave radiation to the BCP in both the data and servo regions. The conductive heat sink layer under the data regions absorbs the microwave radiation and heats the data regions. However, the servo regions will not be heated because there is no conductive heat sink layer beneath those regions. After formation of the BCP components in the data regions one of the BCP components in the data regions is removed. Additional hard mask material is then deposited in the data regions in the spaces between the remaining BCP component. The remaining BCP component in the data regions and the BCP material in the servo regions is then removed, leaving a pattern of hard mask material in both the data and servo regions. This pattern of mask material is then used to etch the underlying substrate to form the imprint template.

For a fuller understanding of the nature and advantages of the present invention, reference should be made to the following detailed description taken together with the accompanying figures.

DETAILED DESCRIPTION OF THE INVENTION

Figure 1:
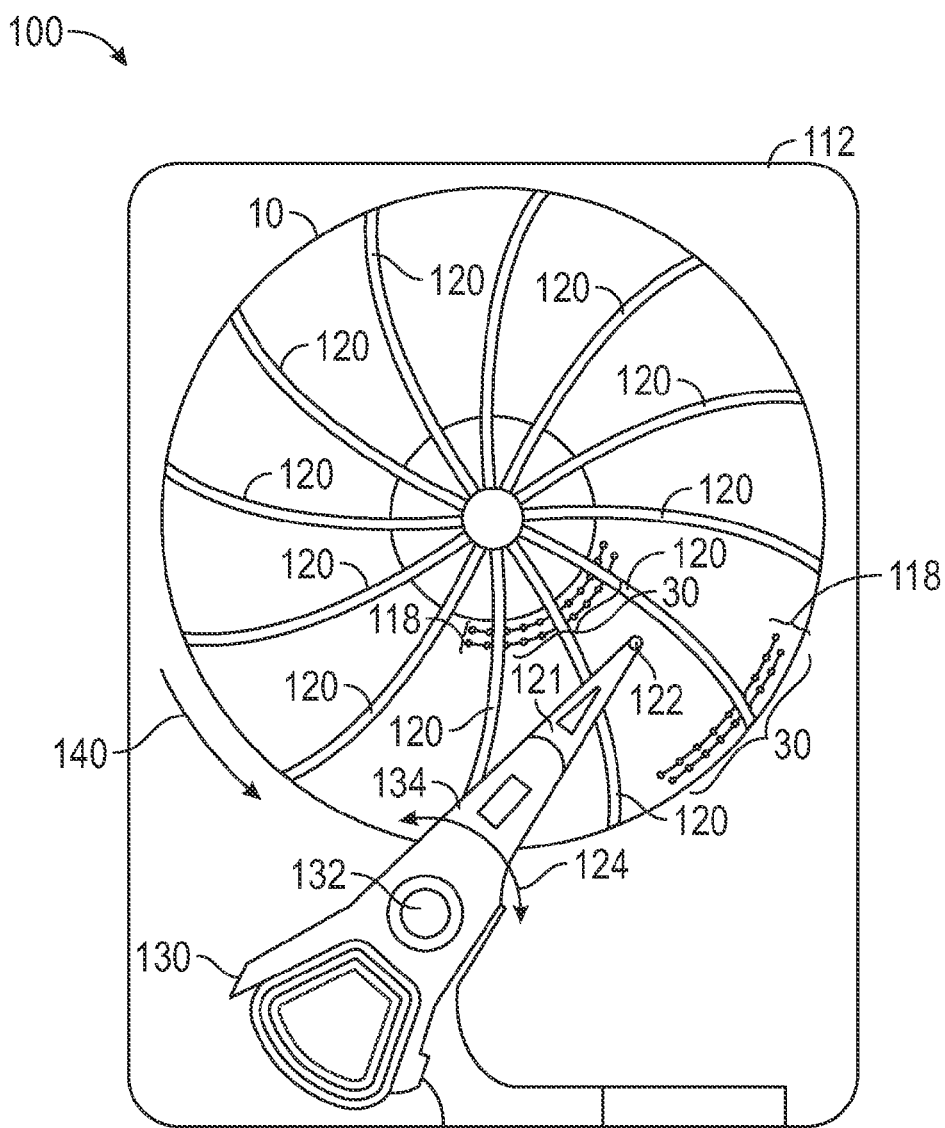
FIG. 1 is a top view of a disk drive with a bit-patterned media (BPM) type of magnetic recording disk as described in the prior art.

FIG. 1 is a top view of a perpendicular magnetic recording disk drive 100 with a bit-patterned media (BPM) disk 10. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head and write head (not shown) are typically formed as an integrated read/write head (not shown) patterned on the trailing surface of the head carrier 122. The data islands 30 on disk 10 are arranged in radially-spaced data tracks 118. The islands 30 are spaced apart, leaving spaces or trenches between the islands 30. As the disk 10 rotates in the direction of arrow 140, the movement of actuator 130 allows the read/write head on the trailing end of head carrier 122 to access different data tracks 118 on disk 10.

Each data track 118 also includes a plurality of circumferentially or angularly-spaced patterned servo regions or sectors 120 that contain positioning information detectable by the read head for moving the read/write heads to desired data tracks and maintaining the heads on the data tracks. The servo sectors in each track are aligned circumferentially with the servo sectors in the other tracks so that they extend across the tracks in a generally radial direction, as represented by radially-directed servo sectors 120. The servo sectors 120 are non-data regions that contain servo information not intended to be re-written during normal operation of the disk drive. The servo sectors contain magnetic servo islands and nonmagnetic servo spaces or trenches. The magnetic state of the servo islands can be set globally by magnetizing the entire disk one or more times in a DC magnetic field.

Figure 2:
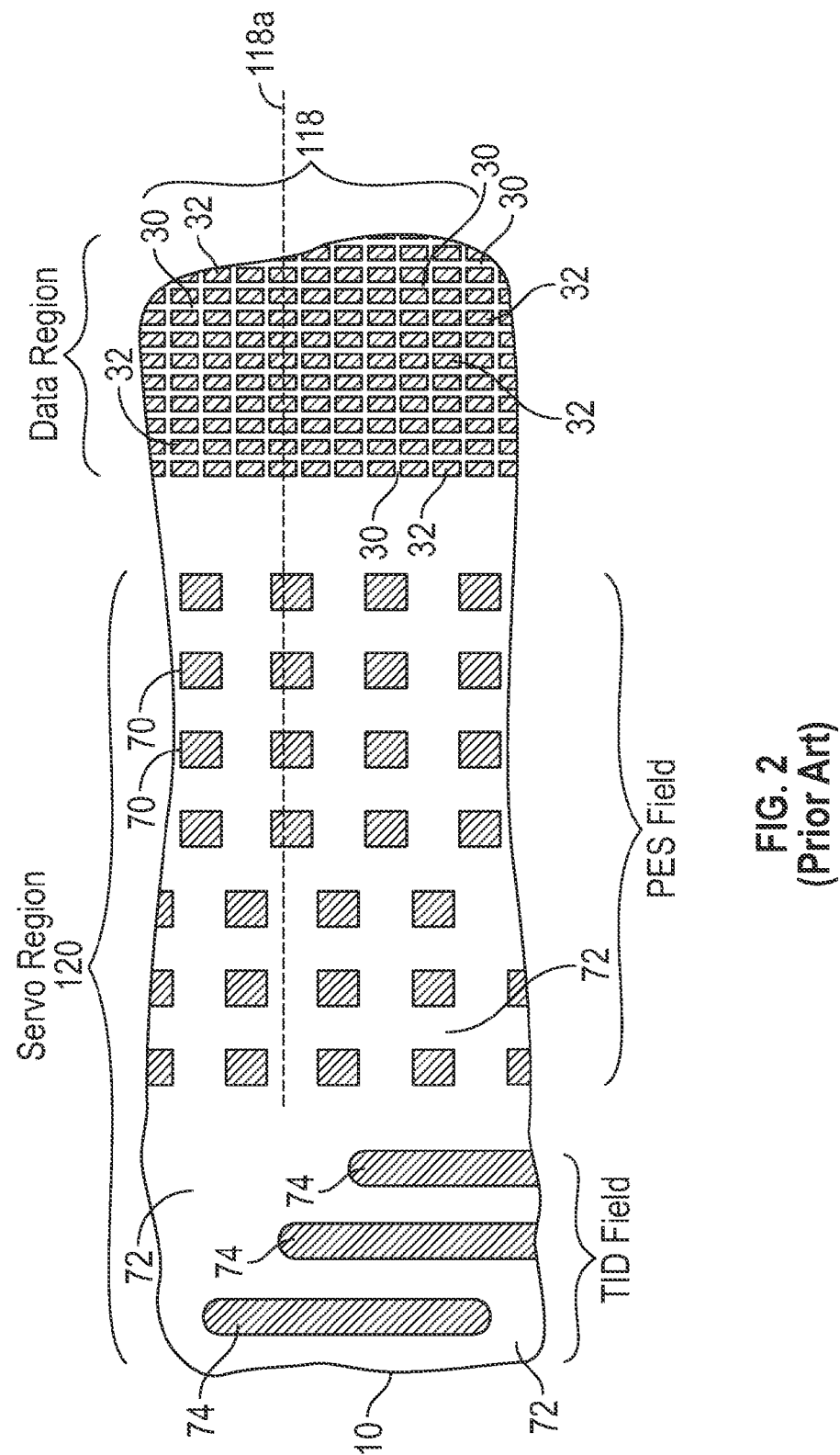
FIG. 2 is a top view of an enlarged portion of a BPM disk showing the detailed arrangement of the data islands in a data region and servo features in a servo region.

FIG. 2 is a top view of disk 10 showing an enlarged portion of a servo region or sector 120 adjacent to a portion of a data region with data tracks 118 with data islands 30 and data trenches 32. The servo sector 120 includes features like servo islands 70, 74 that are spaced-apart to define servo trenches 72. The servo islands 70, 74 and trenches 72 are arranged in a pre-determined pattern that is used to generate the position error signal (PES), track identification (TID), timing signal and other servo information. As the disk moves past the read head along the dashed line corresponding to the centerline of data track 118a, the pattern of servo islands in the PES field passing the read head generates a servo signal that is used to control the actuator 130 (FIG. 1) to maintain the read head or write head on the data track centerline 118a. However, the servo regions also include other fields of different sizes and shapes with different spacings, such as the track identification (TID), which is typically Gray-coded. Servo islands 74 represent portions of Gray-coded TID field. As is apparent from FIG. 2, the servo islands 70, 74 have a wide range of sizes and shapes and form an irregular pattern, as compared to the uniform regularly spaced data islands 30 in the data region. The largest dimension of the servo islands 70, 74 can be in the range of 20 to 200 nm while the width of the data islands 30 is typically about 3 to 30 nm. The width of the servo trenches 72 can be in the range of 5 to 200 nm while the width of the data trenches 32 (the spacing between the data islands 30) is typically only about 5 nm.

BPM disks like that shown in FIG. 2 may be longitudinal magnetic recording disks, wherein the magnetization directions in the magnetizable recording material are parallel to or in the plane of the recording layer in the islands, but are more likely to be perpendicular magnetic recording disks, wherein the magnetization directions are perpendicular to or out-of-the-plane of the recording layer in the islands. To produce the required magnetic isolation of the patterned data islands 30 and servo islands 70, 74, the magnetic moment of the regions 32, 72 must be destroyed or substantially reduced to render these spaces essentially nonmagnetic. The term "nonmagnetic" means that the spaces between the islands are formed of a non-ferromagnetic material, such as a dielectric, or a material that has no substantial remanent moment in the absence of an applied magnetic field, or a magnetic material in a trench recessed far enough below the islands to not adversely affect reading or writing. The nonmagnetic spaces may also be the absence of magnetic material, such as trenches or recesses in the magnetic recording layer or disk substrate.

Figure 3A:
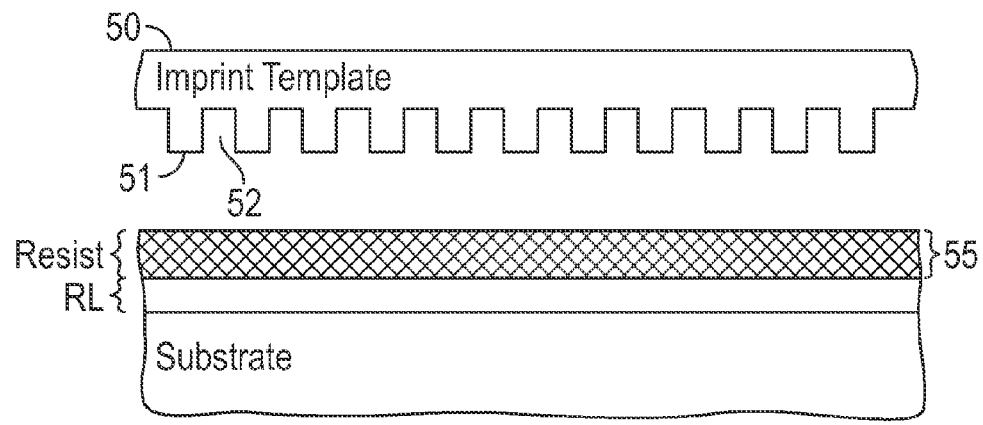
FIGS. 3A-3C are sectional views illustrating the general concept of imprinting according to the prior art.
Figure 3B:
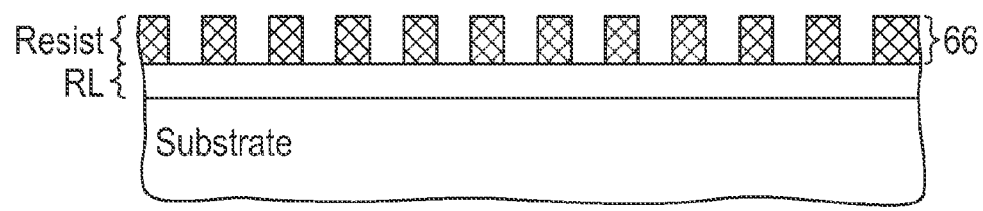
Figure 3C:
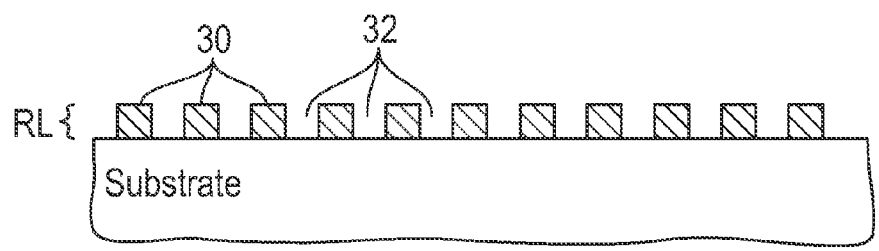

One proposed technique for fabricating BPM disks is by imprinting using a master template. FIGS. 3A-3C are sectional views illustrating the general concept of imprinting. FIG. 3A is a sectional view showing the disk according to the prior art before lithographic patterning and etching to form the data islands. The disk has a substrate supporting a recording layer (RL) having perpendicular (i.e., generally perpendicular to substrate surface) magnetic anisotropy. A layer of imprint resist 55 is formed on the RL. The structure of FIG. 3A is then lithographically patterned by imprinting with a UV-transparent template 50 that has islands 51 and recesses 52 that will form the desired pattern of data islands. The template 50 is typically a fused quartz substrate that has been etched away in different etching steps to form the desired pattern. The template 50 with its predefined pattern is brought into contact with the liquid imprint resist layer, which is a UV-curable polymer, and the template 50 and disk are pressed together. UV light is then transmitted through the transparent template 50 to cure the liquid imprint resist. After the resist has hardened, the template is removed, leaving the inverse pattern of the template on the hardened resist layer. The template is separated from the disk and the patterned imprint resist 66 is left. The resulting structure is shown in FIG. 3B. The patterned imprint resist 66 is then used as an etch mask. Reactive-ion-etching (RIE) can be used to transfer the pattern from the imprint resist to the underlying RL. The imprint resist is then removed, leaving the resulting structure of data islands 30 of RL material separated by nonmagnetic regions 32, as shown in FIG. 3C. As an alternative to the use of a single master template that contains the pattern of data islands shown in FIG. 2, the disk can be patterned in a two-step process by the use of two submaster templates. One submaster template contains a pattern of radial bars with a circumferential pitch corresponding to the along-the-track island pitch of the data islands, and the other submaster template contains a pattern of concentric generally circular rings with a radial pitch corresponding to the track pitch of the data islands. FIGS. 3A-3C are highly schematic representations merely to illustrate the general imprinting process. The disk would typically include additional layers below the RL. Also, the structure of FIG. 3C would typically then be planarized with fill material in the nonmagnetic regions 32, followed by deposition of a protective overcoat and liquid lubricant.

Directed self-assembly of block copolymers (BCPs) has been proposed for making the templates and is believed capable of achieving areal bit densities of greater than 1 Terabit/in$^2$. U.S. Pat. No. 8,119,017 B2 and U.S. Pat. No. 7,976,715 B2, both assigned to the same assignee as this application, describe in detail the use of directed self-assembly of BCPs to form patterns on master or submaster templates. After removal of resist and one of the BCP components, the template substrate has a pattern of protrusions of the other BCP component, which are then used as an etch mask to etch the substrate. This results in either a master template with protrusions of substrate material corresponding to the desired pattern of data islands, or a submaster template with protrusions of substrate material corresponding to the desired pattern of radial bars or circumferential rings.

Another method to generate a master template containing pattern of pillars corresponding to the pattern of data islands is to combine the patterns from two submaster templates using separate imprint steps. Each imprint submaster template is created using directed self-assembly of BCPs, and may also require line-doubling techniques for even smaller pattern size and higher density. Pending application Ser. No. 13/627,492, filed Sep. 26, 2012 and assigned to the same assignee as this application, describes the use of two such imprint submaster templates, one with a pattern of generally radial spokes or lines, and the other with generally concentric rings, to make the master template by two separate imprinting steps with the two submaster templates.

Self-assembling BCPs typically contain two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of BCPs that can be used for forming the self-assembled periodic patterns. If one of the components A or B is selectively removable without having to remove the other, then an orderly arranged structural units of the un-removed component can be formed.

Specific examples of suitable BCPs that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the BCP are determined by the molecular volume ratio between the first and second polymeric block components A and B. When the ratio of the molecular volume of the second polymeric block component B over the molecular volume of the first polymeric block component A is less than about 80:20 but greater than about 60:40, the BCP will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the BCP will form alternating lamellae composed of the first and second polymeric block components A and B. The un-removed component is used as an etch mask to etch the underlying template substrate.

The periodicity or natural pitch ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the BCP of the present invention, the natural pitch ($L_0$) of the repeating structural units can be selected.

In BPM disks, the servo features also need to be fabricated lithographically the same as the data islands. Also, to insure that the servo features can serve their positioning and synchronization functions, they need to be in registration with the data tracks and thus need to be lithographically defined in the same step that defines the data islands in the tracks. The periodic features formed by BCPs are used to fabricate the high-density, highly uniform individual data islands. However, because the servo sectors contain an irregular pattern of servo features of different sizes and shapes they cannot be formed by self-assembly of BCPs.

Embodiments of this invention relate to a method to fabricate a BPM imprint template using BCPs that integrates data region patterning and non-data or servo region patterning. This is achieved through selective localized heating of the BCP in the data regions of the template while protecting the BCP in the servo regions from being heated.

An embodiment for making the BPM imprint template of this invention will be described with FIGS. 4A-4K, which are side sectional views at various stages of the fabrication method. The method will be described in FIGS. 4A-4K for making a submaster template with generally radial lines in the data regions. However, the method is identical for making a submaster template with generally concentric circular lines in the data regions.

Figure 4A:
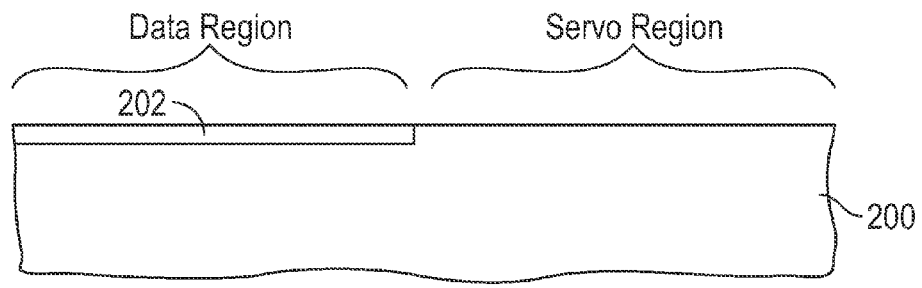
FIGS. 4A-4K are views illustrating the method according to an embodiment of the invention for making an imprint template using a block copolymer (BCP) and selective heating of the BCP in the data regions.

Referring first to FIG. 4A, the substrate 200 comprises a base, which may be formed of any suitable material, such as, but not limited to, single-crystal Si, amorphous Si, silica, fused quartz, silicon nitride, carbon, tantalum, molybdenum, chromium, alumina and sapphire. The substrate is lithographically patterned with resist and then etched in certain regions corresponding to the disk data regions to a depth of approximately 5-30 nm. Then a layer of heat sink material 202 is deposited in the etched areas and the resist removed. The etched areas covered with the heat sink layer 202 are the data regions, while the areas that were protected with the resist are the non-data or servo regions. Thus a plan view of FIG. 4A would look similar to the disk 10 in FIG. 1, with the data regions between the servo sectors 120 containing the heat sink material. The heat sink material may be any material with good thermal conductivity, like Cr, Pd, Pt or Au.

Figure 4B:
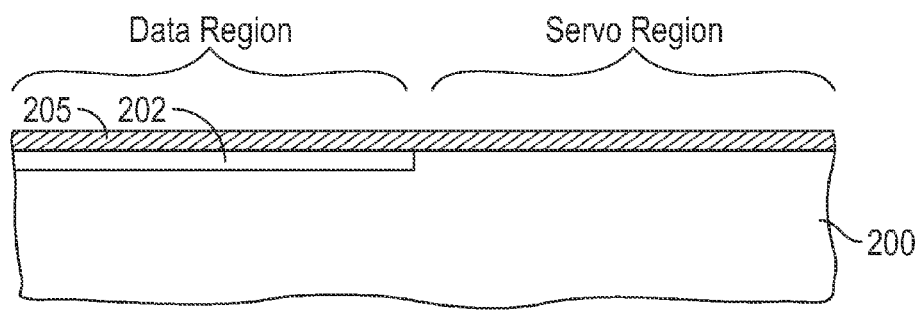

Next in FIG. 4B a sublayer 205 of a material known as the "mat" layer that shows strong wetting affinity by one of the polymer blocks over the other, is deposited onto the substrate 200 over both the data and servo regions. The material of mat layer 205 can be, but is not limited to, a cross-linkable polymer "A" or "B". In the present example, the material of layer 205 is a crosslinkable polystyrene (XPS mat), as described in C. C. Liu, et al., Macromolecules 44 (7), 1876-1885 (2011). The XPS mat is spin-coated on substrate 200 to a thickness of about 3-10 nm, and crosslinked (thermally at about 250° C. in this example). The purpose of the mat layer 205 is to tune the surface energy adequately to promote the desired domain orientation and to provide the adequate wetting conditions for density multiplication when the BCP material is subsequently deposited.

Figure 4C:
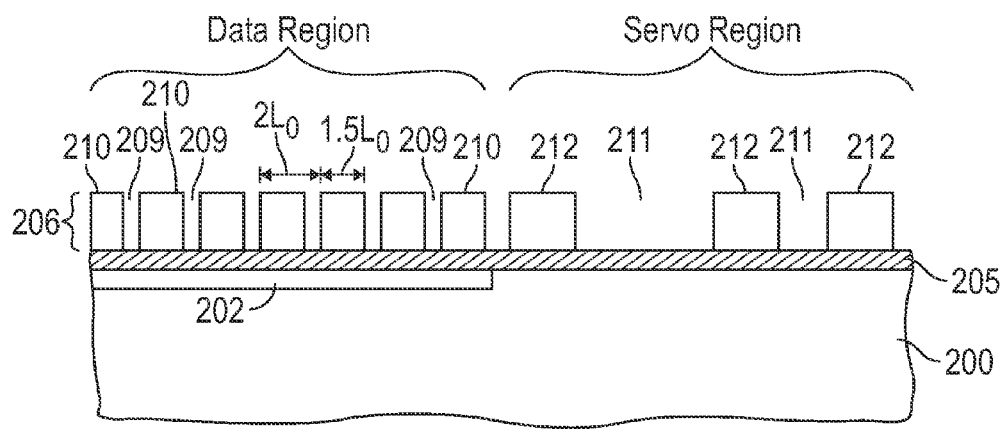

In FIG. 4C a resist layer 206 has been deposited on mat layer 205 and patterned by e-beam lithography. The resist may be a positive e-beam resist like poly methyl methacrylate (PMMA) or ZEP520 from Zeon Chemicals, L.P. The resist layer is patterned by e-beam and developed both in the data and servo regions in a single lithographic step. The e-beam writes, in a positive resist, data trenches 209 that expose portions of mat layer 205 in the data regions and servo trenches 211 that expose portions of mat layer 205 in the servo regions. In the data regions the data trenches 209 are separated by unexposed resist stripes 210 and in the servo regions the servo trenches 211 are separated by unexposed resist features 212, which may be stripes, blocks, etc of various shapes and sizes as required to from the servo features like those depicted in FIG. 2. The data stripes 210 and data trenches 211 have a pitch that is approximately an integer multiple of $L_0$ (i.e., $nL_0$), the known natural pitch for the selected BCP that will be subsequently deposited. The choice of BCP, therefore $L_0$, is determined by the pitch needed in the data regions. The width of the servo features are typically larger than the width of the resist data stripes 210 and the spaces between the servo features, like servo trenches 211, are typically larger than $L_0$. In FIG. 4C, n is 2. The width of each stripe 210 at this step is approximately $1.5L_0$. In disk drive applications where a rotary e-beam writer is used, the lateral orientation of the stripes/trenches is either generally circumferential or radial. In other applications where x-y e-beam writers are used, the lateral orientation of the stripes/trenches is either generally horizontal or vertical.

Figure 4D:
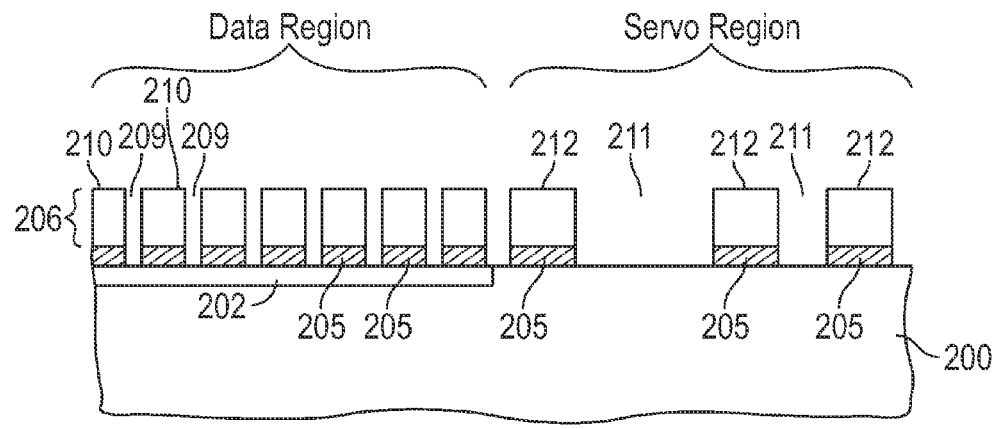

In FIG. 4D, an oxygen plasma reactive ion etching ($O_2$ RIE) process is used to remove portions of the mat layer 205 in the data trenches 209 and servo trenches 211. This exposes the substrate heat sink layer 202 in the data regions and the substrate 200 in the servo regions.

Figure 4E:
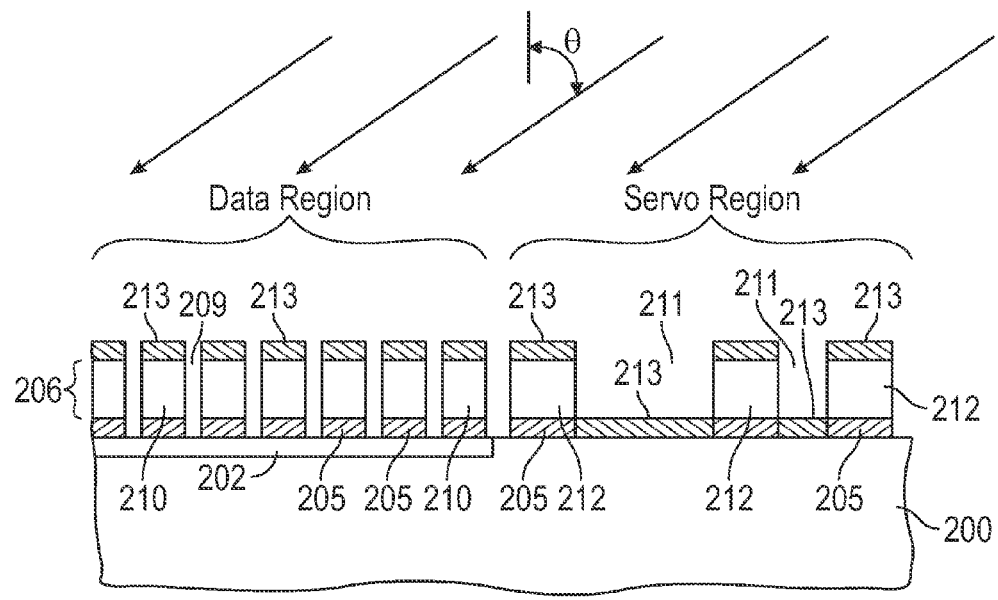

In FIG. 4E, a hard mask layer 213 is deposited by angled deposition over the resist stripes 210 and resist servo features 212 while the substrate is rotated. This is a well-known technique in which the material of the hard mask layer 213 is deposited in a single direction by any technique with a mostly collimated deposition beam such as e-beam evaporation, thermal evaporation or ion beam deposition, using a shadow mask, while the disk is rotated. The disk is rotated about an axis normal to the plane of the substrate while the hard mask material is deposited at an angle θ relative to a normal to the substrate, as shown by the arrows in FIG. 4E. This results in the hard mask material being deposited only on the substrate 200 in the servo trenches 211, but not in the data trenches 209. This is because the angle of deposition is selected, based on the height/width aspect ratio of the resist stripes 210, such that the resist stripes 210 shadow the trenches 209 from the hard mask material 213. For example, the height and width of the resist stripes may be in the range of about 10 to 30 nm and about 10 to 50 nm, respectively. The width of the trenches may be in the range of about 10 to 20 nm. This would result in selection of the angle θ to be between about 64 to 80 degrees. However, because of the much wider spacing of the servo features 212 of resist, the hard mask material is deposited in the servo trenches 211 onto the exposed substrate 200. The hard mask layer 213 may be formed of Cr, SiO2 or Al, for example, and is deposited to a thickness of about 3-5 nm.

Figure 4F:
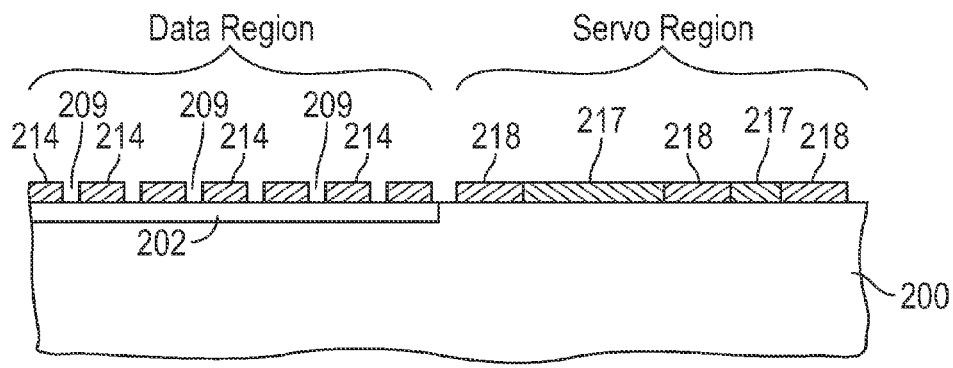
Figure 4G:
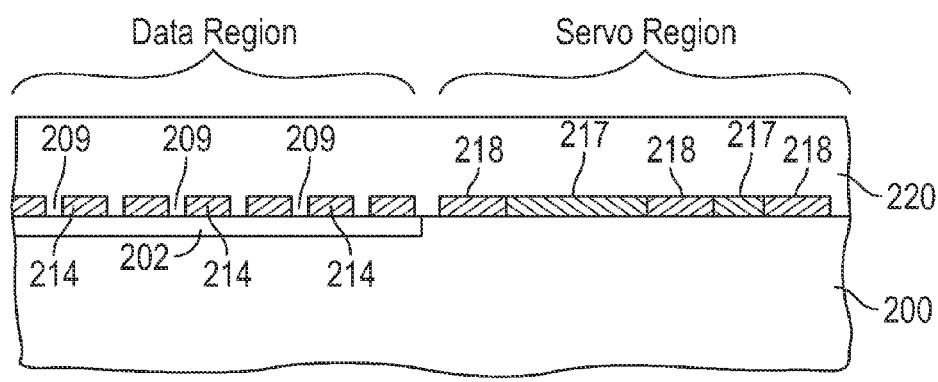

In FIG. 4F, the stripes 210 and servo features 212 of resist are removed by a solvent, such as N-Methyl-2-pyrrolidone (NMP) or isopropyl alcohol (IPA). This leaves a pattern of mat layer stripes 214 and trenches 209 on the heat sink layer 202 in the data regions and a pattern of mat layer features 218 and hard mask features 217 on the substrate 200 in the servo regions. In FIG. 4G, a layer 220 of BCP material is deposited over the mat layer stripes 214 and exposed heat sink layer 202 in the data regions and over the pattern of mat layer features 218 and hard mask features 217 on the substrate 200 in the servo regions. The preferred BCP material is a lamellae-forming copolymer, such as polystyrene-block-polymethylmethacrylate (PS-b-PMMA), with $L_0$ between about 8 nm and 30 nm and is deposited by spin coating to a thickness of about $0.5L_0$ to $3L_0$.

Figure 4H:
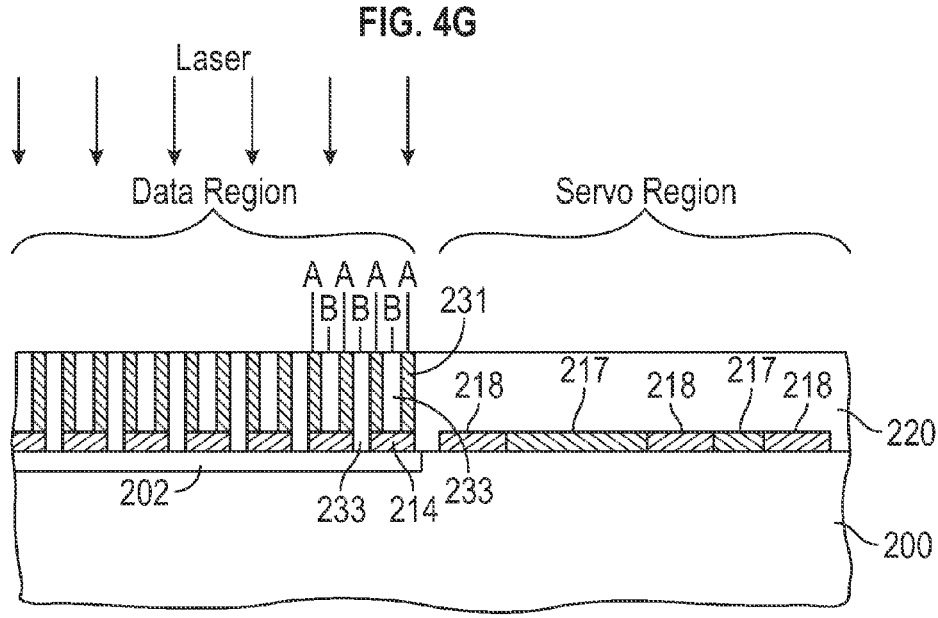

In FIG. 4H, the BCP layer in the data regions has been annealed by selective heating of only the data region without heating the BCP layer in the servo regions. This may be accomplished by directed controlled laser radiation to only the data regions, as shown by the arrows. A continuous or pulsed laser power source with wavelength 400-800 nm, power in the range of 1 mW to 1000 mW, spot size in the range of 500 nm to 100 μm, may be used. Laser power may be distributed over the data region by rastering of the laser or rotating the sample under the laser source for exposure duration in the range of 1-100 msec. As an alternative to the use of a laser, the data regions may be selectively heated by microwave radiation. This may be done through a microwave source (e.g., microwave oven) with wavelength in the range of 10-35 cm, power in the range of 500-1500 W and exposure for a duration of about 10-100 sec. The entire substrate will be exposed to the microwave radiation. The data regions will be heated by the conductive heat sink layer under data regions, which will absorb the radiation. However, the non-data regions will not be heated because there is no heat sink layer beneath those regions. The selective heating of the BCP layer in only the data regions results in phase separation between the A and B components contained in the BCP. In this example, the A component (PS) has an affinity for the mat surfaces and thus forms lines 231 on top of mat stripes 214. When the width of the mat stripes 214 is approximately $1.5L_0$, the B component (PMMA) form in adjacent lines 233 on the mat stripes 214 and in the heat sink material between the mat stripes 214. As a result of the self-assembly of the A and B components this causes the B component to also form lines 233 on the centers of each mat stripes 214. The chemical contrast pattern of mat stripes 214 and heat sink layer 202 thus guide the self-assembly of the PS and PMMA components to form the alternating stripes arranged as lamellae perpendicular to the substrate. The A and B components prefer to self-assemble in parallel lines with a period of $L_0$. If the alternating stripes, determined by the data patterns on the submaster template, are generally circumferential lines, the spacing between stripes is constant. In the case where the alternating stripes are generally radial lines, the $L_0$ cannot be constant over the entire radial length. However, a pattern of alternating radial lines can be accomplished without any significant defects if the variation from $L_0$ does not exceed approximately 10 percent. The heat sink layer 202 in the data regions absorbs heat from the heats source and keeps it confined to the data regions. Also, because the substrate, such as fused quartz, typically has much lower thermal conductivity than the heat sink layer, the heat form the heat source does not travel to the region below the servo regions.

Figure 4I:
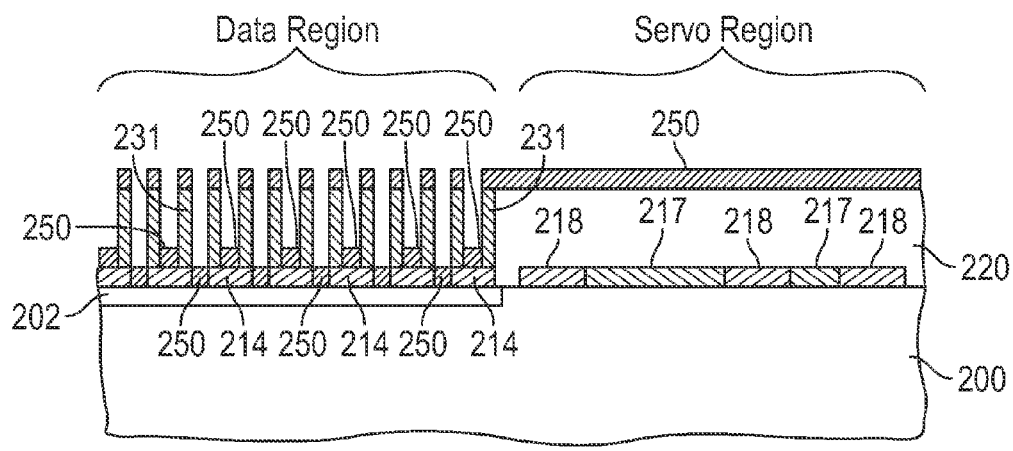

The next step is to selectively remove one block of the BCP. The removal of one block can be done by a wet etch (such as acid or solvent), or a dry etch (such as $O_2$ RIE) in which the etch rate of one block is faster than that of the other. For PS-b-PMMA, this can be achieved by selectively removing the B block (PMMA) by exposure to UV radiation to scission the PMMA chains, as described in T. Thurn-Albrecht et al., Advanced Materials 12 (11), 787-791 (2000). This is followed by a wet etch (acetic acid, IPA or other selective solvent) or a dry etch process ($O_2$ RIE), leaving lines 231 of the A component (PS) arranged as lamellae perpendicular to the substrate in the data regions and the un-annealed BCP 220 in the servo regions. Then a layer of hard mask material is again deposited over the remaining A component stripes 231 in the data regions and over the BCP material in the servo regions. FIG. 4I shows the resulting cross-section after the B component removal and after deposition of hard mask layer 250. The hard mask material is deposited onto the tops of A component stripes 231, into the data trenches 209 onto the exposed heat sink layer 202, over portions of mat layer 214 and onto the top of BCP layer 220 in the servo regions.

Figure 4J:
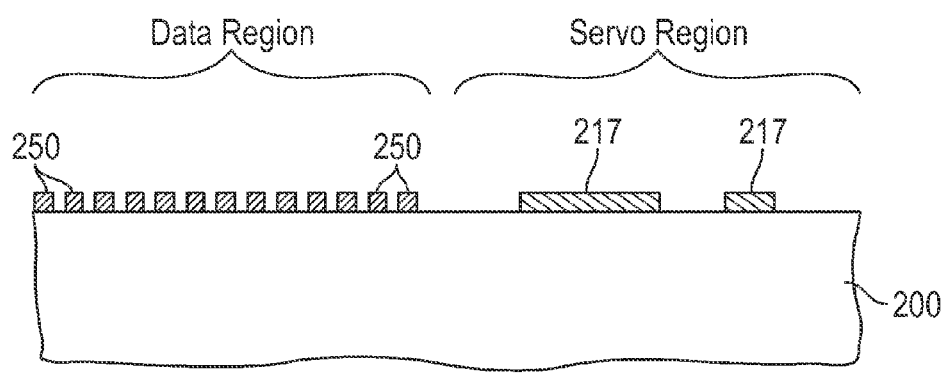
Figure 4K:
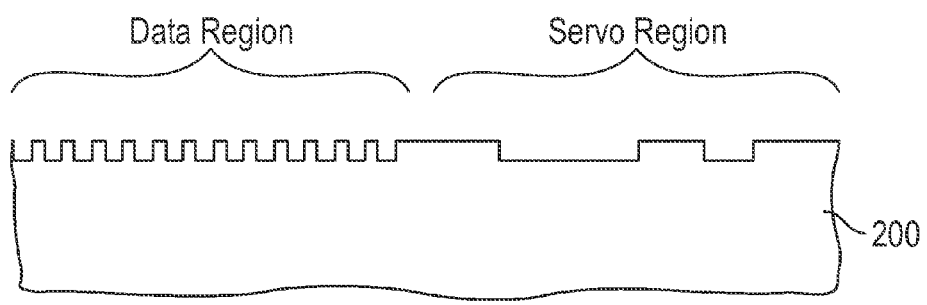

FIG. 4J shows the pattern of hard mask material 250 in the data regions and hard mask features 217 in the servo regions after removal of the A component material in the data regions and after removal of the BCP material and underlying mat layer in the servo regions. This is accomplished by a wet process such as a "piranha" bath (a mixture of sulfuric acid and hydrogen peroxide). Next the heat sink layer 202 is etched away in the data regions by reactive ion etching or by ion milling. The remaining pattern of hard mask layer and heat sink is used as an etch mask to etch the underlying substrate 200 to create the completed imprint template. After etching the substrate by reactive ion etching, the hard mask material is removed, leaving the imprint template as shown in FIG. 4K.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method using a block copolymer (BCP) for making an imprint template containing data regions and non-data regions separated from the data regions, the method comprising:
   providing a substrate;
   forming a heat sink layer on the substrate only in the data regions;
   depositing on the heat sink layer in the data regions and on the substrate in the non-data regions a sublayer for the BCP;
   patterning the sublayer into a pattern of stripes and spaces in the data regions and a pattern of features in the non-data regions;
   depositing hard mask material only in the non-data regions between the features in the non-data regions by directing hard mask material at an angle relative to the plane of the substrate while rotating the substrate about an axis orthogonal to the plane of the substrate using the stripes as a shadow mask to prevent deposition of hard mask material in the spaces between the stripes in the data regions;
   depositing a BCP simultaneously in the data regions and the non-data regions;
   selectively heating the BCP only in the data regions, the heat being absorbed by the underlying heat sink material in the data regions, to cause phase separation of the BCP into first and second components in the data regions, wherein there is no phase separation of the BCP in the non-data regions;
   removing one of the BCP components in the data regions, leaving the other BCP component in the data regions and leaving the BCP over the features in the non-data regions; and
   removing the BCP in the non-data regions leaving the pattern of features in the non-data regions.

2. The method of claim 1 wherein heating the BCP in the data regions comprises directing laser radiation to the BCP in the data regions, the heat generated being absorbed by the underlying heat sink material.

3. The method of claim 1 wherein heating the BCP in the data regions comprises directing microwave radiation to the BCP in the data regions and the non-data regions, the microwave radiation being absorbed by the heat sink material underlying the data regions.

4. The method of claim 1 further comprising, after removing one of the BCP components, depositing hard mask material in the data regions between the other BCP component.

5. A method using a block copolymer (BCP) for making a bit-patterned media (BPM) imprint template containing data regions and non-data regions separated from the data regions, the method comprising:
   providing a substrate having a heat sink layer only in the data regions;
   depositing on the substrate a sublayer for the BCP;
   patterning the sublayer into a pattern of stripes in the data regions and a pattern of features in the non-data regions, the stripes being substantially equally spaced and having a stripe pitch of approximately $nL_0$, where n is an integer and $L_0$ is the natural pitch of the BCP, the features being larger than the width of the stripes and the spaces between the features being larger than $L_0$;
   depositing hard mask material onto the substrate only in the spaces between the features in the non-data regions by directing hard mask material at an angle relative to the plane of the substrate while rotating the substrate about an axis orthogonal to the plane of the substrate using the stripes as a shadow mask to prevent deposition of hard mask material between the stripes in the data regions;

depositing a BCP having a natural pitch $L_0$ simultaneously over the stripes and spaces in the data regions and over the features and hard mask material in the non-data regions;

heating the BCP in the data regions, the heat being absorbed by the underlying heat sink layer to cause phase separation of the BCP into first and second components in the data regions, wherein there is no phase separation of the BCP in the non-data regions, the BCP in the data regions being guided by the stripes to self-assemble into alternating lines of first and second components of the BCP in the data regions;

removing the lines of one of the BCP components in the data regions, leaving lines of the other BCP component in the data regions and leaving the BCP over the features in the non-data regions;

depositing hard mask material onto the substrate in the spaces between the lines of said other BCP component in the data regions;

removing the lines of the second BCP component in the data regions and the BCP in the non-data regions, leaving hard mask lines in the data regions and hard mask features in the non-data regions;

etching the substrate using the hard mask lines and features as an etch mask; and removing the hard mask material.

6. The method of claim 5 wherein heating the BCP in the data regions comprises directing laser radiation to the BCP in the data regions, the heat generated being absorbed by the underlying heat sink material.

7. The method of claim 5 wherein heating the BCP in the data regions comprises directing microwave radiation to the BCP in the data regions and the non-data regions, the microwave radiation being absorbed by the heat sink material underlying the data regions.

8. The method of claim 5 wherein the stripes are concentric generally circular rings and the stripe pitch is the radial pitch of the rings.

9. The method of claim 5 wherein the stripes are radial bars and the stripe pitch is the circumferential pitch of the bars.

10. The method of claim 5 wherein the data regions are annular sectors and the non-data regions are servo sectors extending radially between the annular sectors.

\* \* \* \* \*